United States Patent
Yun et al.

(10) Patent No.: US 10,454,692 B2
(45) Date of Patent: Oct. 22, 2019

(54) METHOD FOR SUPPLYING POWER IN NETWORK AND APPARATUS THEREFOR

(71) Applicant: Hyundai Motor Company, Seoul (KR)

(72) Inventors: Jin Hwa Yun, Seoul (KR); Jeong Seok Han, Gyeonggi-Do (KR); Dong Ok Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 15/478,812

(22) Filed: Apr. 4, 2017

(65) Prior Publication Data

US 2017/0302462 A1    Oct. 19, 2017

(30) Foreign Application Priority Data

Apr. 14, 2016  (KR) .................. 10-2016-0045287

(51) Int. Cl.
| | |
|---|---|
| *H04L 12/10* | (2006.01) |
| *H04L 12/26* | (2006.01) |
| *H04L 29/08* | (2006.01) |
| *B60R 16/03* | (2006.01) |

(52) U.S. Cl.
CPC .......... *H04L 12/10* (2013.01); *H04L 43/0811* (2013.01); *H04L 43/0817* (2013.01); *H04L 67/12* (2013.01); *B60R 16/03* (2013.01); *H04L 43/16* (2013.01)

(58) Field of Classification Search
CPC ......... B60R 16/03; H04L 12/10; H04L 43/16; H04L 67/12; H04L 43/0817; H04L 43/0811
See application file for complete search history.

(56) References Cited

U.S. PATENT DOCUMENTS

| | | | |
|---|---|---|---|
| 2007/0041387 A1* | 2/2007 | Ghoshal .................. | H04L 12/10 370/395.52 |
| 2011/0113276 A1* | 5/2011 | Diab ....................... | G06F 1/266 713/340 |
| 2013/0191654 A1* | 7/2013 | Schlichter ............... | G06F 1/266 713/300 |

* cited by examiner

*Primary Examiner* — Jared Fureman
*Assistant Examiner* — Duc M Pham
(74) *Attorney, Agent, or Firm* — Mintz Levin Cohn Ferris Glovsky and Popeo, P.C.; Peter F. Corless

(57) ABSTRACT

An operation method of a first communication node in a vehicle network, which includes a power sourcing equipment (PSE) for supplying power to a second communication node and a powered device (PD) for obtaining power from the second communication node, includes: operating the first communication node in a first mode based on the PSE that is activated and the PD that is inactivated; receiving a first signal requesting power supply from the second communication node; and supplying power to the second communication node in response to the first signal.

20 Claims, 4 Drawing Sheets

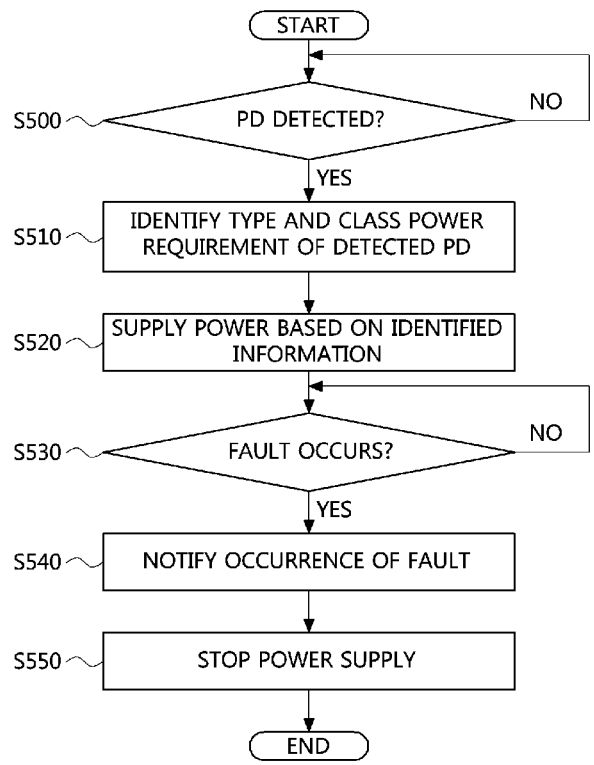
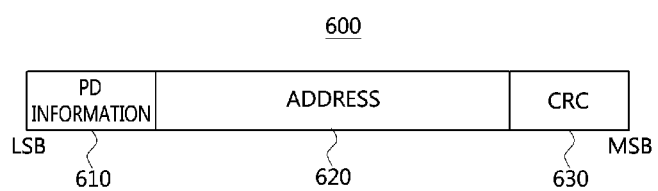

METHOD FOR SUPPLYING POWER IN NETWORK AND APPARATUS THEREFOR

CROSS-REFERENCE TO RELATED APPLICATION

This application claims the benefit of and priority to Korean Patent Application No. 10-2016-0045287, filed on Apr. 14, 2016 in the Korean Intellectual Property Office (KIPO), the entirety of which is incorporated by reference as if fully set forth herein.

TECHNICAL FIELD

The present disclosure relates to methods for supplying power in a vehicle network and apparatuses for the same, and more specifically, to methods for supplying power based on a power over data line (PoDL) scheme in a vehicle network and apparatuses for the same.

BACKGROUND

The number and variety of electronic devices installed within vehicles have been increasing significantly along with the recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, a vehicle CAN may support a transmission rate of up to 1 Mbps, automatic retransmission of colliding messages, error detection based on a cycle redundancy interface (CRC), and the like. The FlexRay-based network may support a transmission rate of up to 10 Mbps, simultaneous transmission of data through two channels, synchronous data transmission, and the like. The MOST-based network is a communication network for high-quality multimedia, which may support a transmission rate of up to 150 Mbps.

Meanwhile, the telematics system and the infotainment system, like most enhanced safety systems of a vehicle, require higher transmission rates and system expandability. However, the CAN, FlexRay-based network, and the like may not sufficiently support such requirements. The MOST-based network, in particular, may support a higher transmission rate than the CAN or FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like.

The power line for power supply in a vehicle network may be separated from the data line used for communications between electronic devices in the vehicle network. In this case, electronic devices may acquire power through the power line and receive data through the data line. Alternatively, power and data in a vehicle network may be transmitted over a single line. For example, power can be transmitted over a data line used for communications. However, when power and data are transmitted through a single line, the power supply may terminate if a fault occurs inside or outside the electronic device. Thus, an electronic device which cannot obtain power may fail to operate, thereby causing problems in the vehicle network.

SUMMARY

The present disclosure provides in-vehicle power supply methods based on a power over data line (PoDL) scheme in a vehicle network and apparatuses for the same.

In accordance with embodiments of the present disclosure, an operation method of a first communication node in a vehicle network, which includes a power sourcing equipment (PSE) for supplying power to a second communication node and a powered device (PD) for obtaining power from the second communication node, includes: operating the first communication node in a first mode based on the PSE that is activated and the PD that is inactivated; receiving, from the second communication node, a first signal requesting power supply; and supplying power to the second communication node in response to the first signal.

The first communication node may be coupled to the second communication node via a data line, the first signal may be received from the second communication node via the data line, and the power may be supplied to the second communication node from the first communication node via the data line.

The operation method may further include operating the first communication node in a second mode based on the PSE that is inactivated and the PD that is activated when the first communication node is in a fault state.

The second communication node may include a PD for obtaining the power supplied from the first communication node.

The operation method may further include determining power supply is requested from the second communication node when the first signal has a voltage within a predetermined range.

The operation method may further comprise monitoring the data line; and stopping the power supply to the second communication node when the second communication node is determined to be in a fault state based on a result of the monitoring of the data line.

The operation method may further include determining the second communication node is in the fault state when an output voltage of the first communication node is outside a predetermined range.

The operation method may further include determining the second communication node is in the fault state when an output current of the first communication node is outside a predetermined range.

The operation method may further include transmitting a second signal including an indicator indicating an occurrence of a fault.

The second signal may further include an identifier of the second communication node in the fault state.

The operation method may further comprise storing a fault code indicating a cause of the fault in a database.

Further, in accordance with embodiments of the present disclosure, an operation method of a first communication node in a vehicle network, which includes a power sourcing equipment (PSE) for supplying power to a second communication node and a powered device (PD) for obtaining power from the second communication node, includes: operating the first communication node in a first mode based on the PSE that is inactivated and the PD that is activated; transmitting, to the second communication node, a first signal requesting power supply; and obtaining power from the second communication node after transmitting the first signal.

The first communication node may be coupled to the second communication node via a data line, the first signal may be transmitted to the second communication node via the data line, and the first communication node obtains the power from the second communication node via the data line.

The operation method may further include operating the first communication node in the first mode when the first communication node is in a fault state.

The second communication node may include a PSE for supplying the power to the first communication node.

The operation method may further comprise operating in a power-off mode when the first communication node is determined to be in a fault state.

The operation method may further comprise transmitting a second signal including an indicator indicating an occurrence of a fault when a third communication node coupled to the first communication node is determined to be in a fault state.

Further, in accordance with embodiments of the present disclosure, a first communication node in a vehicle network includes: a physical (PHY) layer unit supporting a physical layer function; a power sourcing equipment (PSE) supplying power to a second communication node via a data line in the vehicle network; and a powered device (PD) obtaining power from the second communication node via the data line.

The PD may be inactivated when the PSE is activated, and the PD may be activated when the PSE is inactivated.

The PSE may receive a signal requesting power supply from the second communication node, and the PSE may supply the power to the second communication node in response to the received signal.

The PD may transmit a signal requesting power supply to the second communication node, and the PD may obtain the power from the second communication node after transmitting the signal.

According to the embodiments of the present disclosure, a communication node including both of a PSE and a PD is provided. The communication node may use the PSE to supply power to other communication nodes. If the PSE is in a fault state, the communication node may use the PD to obtain power from another communication node. Further, the communication node may identify an occurrence of a fault, and store information related to the fault (e.g., whether a fault has occurred, a cause of the fault, an identifier of a faulty communication node, etc.) in a database. Also, it is possible to notify the other communication nodes of the information related to the fault.

BRIEF DESCRIPTION OF DRAWINGS

Embodiments of the present disclosure will become more apparent by describing in detail forms of the present disclosure with reference to the accompanying drawings, in which:

FIG. 5 is a flow chart demonstrating embodiments of an operation method of a communication node in a vehicle network based on PoDL;

FIG. 6 is a block diagram illustrating a signal generated by a communication node.

Figure 1:
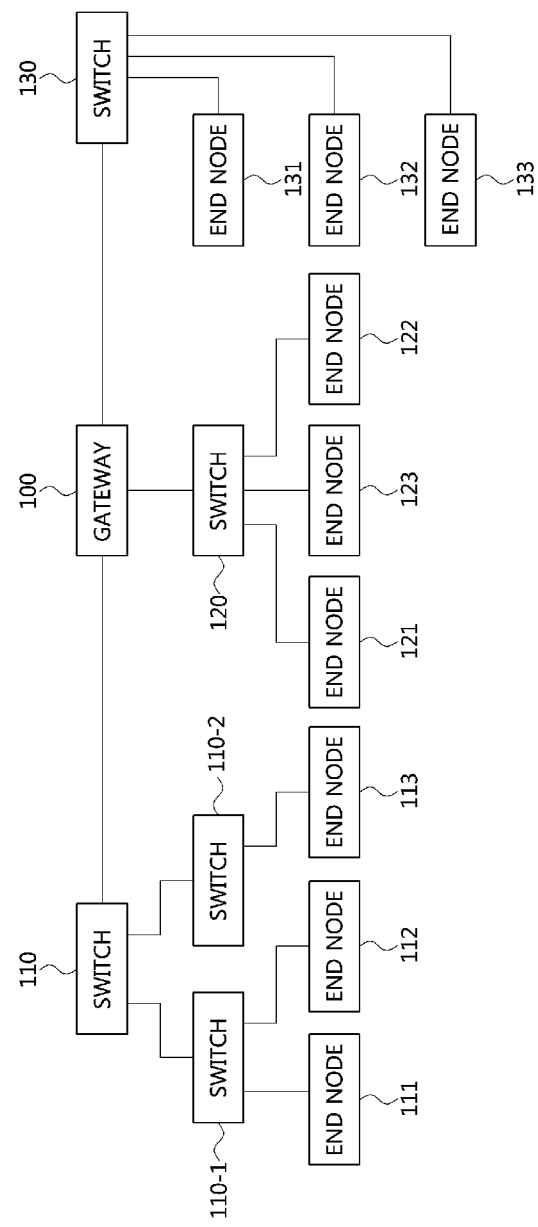
FIG. 1 is a diagram illustrating a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram illustrating a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. However, the network topology to which embodiments of the present disclosure may be applied is not limited thereto and may be configured in various ways.

Figure 2:
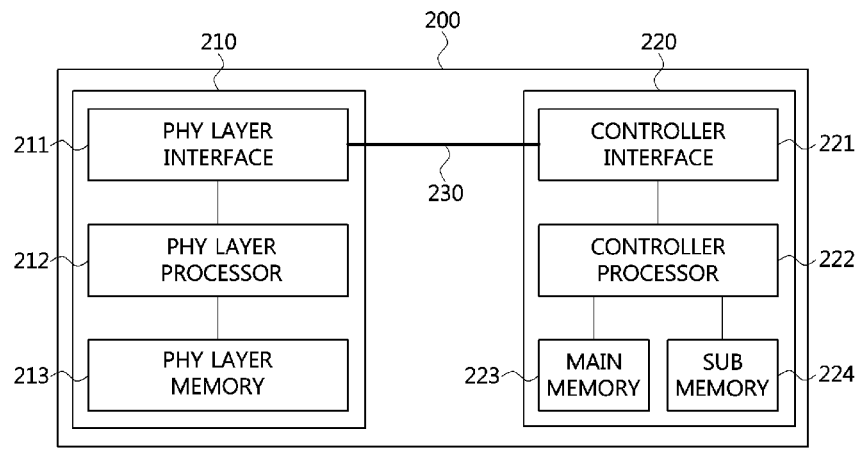
FIG. 2 is a diagram illustrating a communication node constituting a vehicle network according to embodiments of the present disclosure.

FIG. 2 is a diagram illustrating a communication node in a vehicle network according to embodiments of the present disclosure. Notably, the various methods discussed below may be executed by a controller having a processor and a memory.

As shown in FIG. 2, a communication node 200 of a network may include a PHY layer 210 and a controller 220. In addition, the communication node 200 may further include a regulator (not shown) for supplying power. In particular, the controller 220 may be implemented to include a medium access control (MAC) layer. A PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

Furthermore, the PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
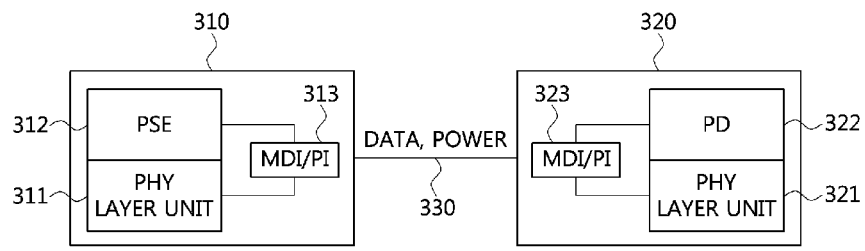
FIG. 3 is a block diagram illustrating embodiments of a vehicle network based on PoDL.

FIG. 3 is a block diagram illustrating embodiments of a vehicle network based on PoDL.

As shown in FIG. 3, a communication node 310 may be coupled to a communication node 320 via a data line 330 (e.g., a link segment). Each of the communication nodes 310 and 320 may be a gateway, a switch (or bridge), or an end node. Each of the communication nodes 310 and 320 may support the IEEE 802.3bu standard. The communications between the communication nodes 310 and 320 may be performed through the data line 330. Power may also be transferred through the data line 330. For example, the communication node 310 may supply a power through the data line 330 and the communication node 320 may obtain the power through the data line 330.

The communication node 310 may include a PHY layer unit 311, a power sourcing equipment (PSE) 312 and a medium dependent interface/power interface (MDI/PI) 313. The communication node 310 may further include a MAC layer unit (omitted in FIG. 3). The MAC layer unit may be the same as or similar to the MAC layer unit 220 described with reference to FIG. 2. The PHY layer unit 311 may be the same as or similar to the PHY layer unit 210 described with reference to FIG. 2. The PSE 312 may be a PSE as specified in the IEEE 802.3bu standard. Thus, the PSE 312 may detect a powered device (PD) 322 (or the communication node 320 including the PD 322) and supply a power to the PD 322 (or the communication node 320 including the PD 322).

The MDI/PI 313 may be an MDI/PI defined in the IEEE 802.3bu standard. In the MDI/PI 313, the MDI may be an interface between the PHY layer unit 311 and the data line 330. The MDI may support transmission or reception of data through the data line 330. In the MDI/PI 313, the PI may be an interface between the PSE 312 and the data line 330. The PI may support monitoring operations for the state (e.g., voltage, current, etc.) of the data line 330 and may support the power supply operations through the data line 330. The PI may exist separately from the MDI, or it may exist as contained within the MDI.

The communication node 320 may include a PHY layer unit 321, the PD 322, and an MDI/PI 323. The communication node 320 may further include a MAC layer unit (omitted in FIG. 3). The MAC layer unit may be the same as or similar to the MAC layer unit 220 described with reference to FIG. 2. The PHY layer unit 321 may be the same as or similar to the PHY layer unit 210 described with reference to FIG. 2. The PD 322 may be a PD as specified in the IEEE 802.3bu standard. The PD 322 may request the PSE 312 (or the communication node 310 including the PSE 312) to supply a power to the PD 322, and obtain the power supplied from the PSE 312 (or the communication node 310 including the PSE 312) in response to the power supply request.

The MDI/PI 323 may be an MDI/PI defined in the IEEE 802.3bu standard. In the MDI/PI 323, the MDI may be an interface between the PHY layer unit 321 and the data line 330. The MDI may support transmission or reception of data through the data line 330. In the MDI/PI 323, the PI may be an interface between the PD 322 and the data line 330. The PI may support the power acquisition operations through the data line 330. The PI may exist separately from the MDI, or it may exist as contained within the MDI.

The communication node 310 may operate based on the power supplied from the PSE 312, and supply the power to other communication nodes through the PSE 312. However, since the communication node 310 does not include a PD, it cannot obtain a power from another communication node. Therefore, the communication node 310 may not obtain a power when the PSE 312 is faulty, and thus the operation of the communication node 310 may be stopped.

On the other hand, the communication node 320 may acquire a power from the communication node 310 and may operate based on the power. However, since the communication node 320 does not include a PSE, it may not have its independent power. Accordingly, the communication node 320 cannot acquire power from the communication node 310 when the communication node 310 including the PSE 312 is faulty, and then the operation of the communication node 320 may be stopped.

Meanwhile, in a case that a communication node includes both of the PSE and the PD, the above-mentioned problem (for example, the operation stop of the communication node) may be resolved. The communication node including both the PSE and the PD may be configured as follows.

Figure 4:
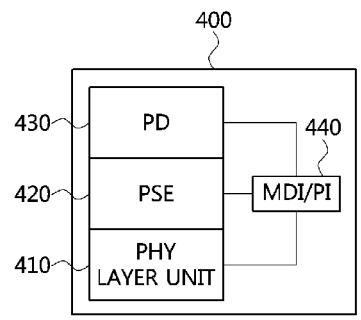
FIG. 4 is another diagram showing a communication node in a vehicle network according to embodiments of the present disclosure.

FIG. 4 is another diagram showing a communication node in a vehicle network according to embodiments of the present disclosure.

As shown in FIG. 4, a communication node 400 may include a PHY layer unit 410, a PSE 420, a PD 430, and an MDI/PI 440. The communication node 400 may further include a MAC layer unit (not shown in FIG. 4). The MAC layer unit may be the same as or similar to the MAC layer unit 220 described with reference to FIG. 2. The communication node 400 may be a gateway, a switch (or bridge), an end node, or the like. The PHY layer unit 410 may be the same as or similar to the PHY layer unit 210 described with reference to FIG. 2.

The PSE 420 may be a PSE as specified in the IEEE 802.3bu standard. Thus, the PSE 420 may detect a PD (i.e., a PD in another communication node) and supply a power to the detected PD (or the communication node including the detected PD). The PD 430 may be a PD as specified in the IEEE 802.3bu standard. The PD 430 may request a PSE (i.e., a PSE in another communication node) to supply a power to the PD 430, and acquire the power supplied from the PSE (or the communication node including the PSE) in response to the power supply request.

The MDI/PI 440 may be an MDI/PI defined in the IEEE 802.3bu standard. In the MDI/PI 440, the MDI may be an interface between the PHY layer unit 410 and the data line (not shown in FIG. 4). The MDI may support transmission or reception of data through the data line. In the MDI/PI 440, the PI may be an interface among the data line, the PSE 420, and the PD 430. The PI may support the power supply or acquisition operations through the data line. The PI may exist separately from the MDI, or it may exist as contained within the MDI.

The communication node 400 may have two operation modes. The two operation modes may include a PSE mode and a PD mode. The default operation mode may be the PSE mode. In the PSE mode, the communication node 400 may operate based on the PSE 420 that is activated and the PD 430 that is inactivated. Thus, the communication node 400 may operate based on the power (e.g., main power) supplied by the activated PSE 420, and may supply the power to other communication nodes via the activated PSE 420. In the PD mode, the communication node 400 may operate based on the PSE 420 that is inactivated and the PD 430 that is activated. Thus, the communication node 400 may obtain a power (e.g., redundancy power) from another communication node via the PD 430 and may operate based on the obtained power. The PSE 420 and the PD 430 may be activated or deactivated under the control of the PHY layer unit 410 (or, the MAC layer unit).

An exemplary explanation of specific operations of the communication node 400 in the PSE mode will be described as follows.

FIG. 5 is a flow chart explaining embodiments of an operation method of a communication node in a vehicle network based on PoDL.

As shown in FIG. 5, a first communication node (e.g., the communication node 400 described with reference to FIG. 4) may operate in the PSE mode, which is the default operational mode for the PSE operating normally. The case that the PSE is normally operated may mean that power is normally supplied by the PSE (for example, when the circuit constituting the PSE is not in an open state or a short state).

The first communication node (or, the PSE included in the first communication node) may identify a presence of a PD or a second communication node including the PD by monitoring a data line connected to the second communication node including the PD. Here, the second communication node may be the communication node 320 described with reference to FIG. 3 or the communication node 400 operating in the PD mode described with reference to FIG. 4. For example, the first communication node may determine that the PD (or, the second communication node including the PD) exists when a voltage within a predetermined range (e.g., 2.8 volts to 3.2 volts) is detected in the data line. In this case, the first communication node may determine that power supply is requested from the second communication node. On the contrary, when the first communication node detects a voltage outside the predetermined range (for example, a voltage lower than 2.8 volts or a voltage higher than 3.2 volts) in the data line, the first communication node may determine that the PD (or, the second communication node including the PD) does not exist.

In the case that the second communication node including the PD is detected (i.e., when the power supply is requested from the second communication node), the first communication node may identify the type and the class power requirement of the PD included in the second communication node. The type of the PD may be classified into an 'A' type supporting 100BASE-T1 Ethernet, a 'B' type supporting 1000BASE-T1 Ethernet, and an 'A+B' type supporting both 100BASE-T1 Ethernet and 1000BASE-T1 Ethernet. However, the type of the PD is not limited to the above examples, and the type of the PD may be variously defined. For example, a type supporting 10GBASE Ethernet, or a type supporting 100GBASE Ethernet may be further defined. The class power requirements of the PD may be defined as shown in Table 1 and Table 2 below.

TABLE 1

| | Class Power Requirements | | | | | |
|---|---|---|---|---|---|---|
| | 12 V unregulated | | 12 V regulated | | 24 V unregulated | |
| | (a) | (b) | (a) | (b) | (a) | (b) |
| $V_{PSE(max)}$ (V) | 18 | 18 | 18 | 18 | 36 | 36 |
| $V_{PSE(min)}$ (V) | 5.60 | 5.77 | 14.4 | 14.4 | 11.7 | 11.7 |
| $I_{PI(max)}$ (A) | 0.109 | 0.267 | 0.249 | 0.471 | 0.097 | 0.339 |

TABLE 1-continued

| | Class Power Requirements | | | | | |
|---|---|---|---|---|---|---|
| | 12 V unregulated | | 12 V regulated | | 24 V unregulated | |
| | (a) | (b) | (a) | (b) | (a) | (b) |
| $V_{PD(min)}$ (V) | 4.61 | 3.75 | 12.0 | 10.6 | 10.3 | 8.86 |
| $P_{PD}$ (W)² | 0.5 | 1 | 3 | 5 | 1 | 3 |
| SCCP Class code | 0 | 1 | 2 | 3 | 4 | 5 |

TABLE 2

| | Class Power Requirements | | | | | |
|---|---|---|---|---|---|---|
| | 24 V regulated | | 48 V unregulated | | 48 V regulated | |
| | (a) | (b) | (a) | (b) | (a) | (b) |
| $V_{PSE(max)}$ (V) | 36 | 36 | 60 | 60 | 60 | 60 |
| $V_{PSE(min)}$ (V) | 26.0 | 26.0 | 23.1 | 23.6 | 48.0 | 48.0 |
| $I_{PI(max)}$ (A) | 0.215 | 0.461 | 0.248 | 0.532 | 0.735 | 1.36 |
| $V_{PD(min)}$ (V) | 23.3 | 21.7 | 20.2 | 18.8 | 40.8 | 36.7 |
| $P_{PD}$ (W)² | 5 | 10 | 5 | 10 | 30 | 50 |
| SCCP Class code | 6 | 7 | 8 | 9 | 10 | 11 |

The $V_{PSE(max)}$ may be the maximum voltage measured at the PI of the first communication node. The $V_{PSE(min)}$ may be the minimum voltage measured at the PI of the first communication node. The $I_{PI(max)}$ may be the maximum current measured at the PI of the first communication node. The $V_{PD(min)}$ may be the minimum voltage measured at the PI of the second communication node including the PD. The $P_{PD}$ may be the power available at the PI of the second communication node including the PD. The serial communication classification protocol (SCCP) class code may be the class code defined in the SCCP.

In step S510, the first communication node (e.g., the PSE and the PHY layer unit included in the first communication node) may transmit, to the second communication node, a signal requesting information related to the type and class power requirement of the PD included in the second communication node. Then, the second communication node (e.g., the PD and the PHY layer unit included in second communication node) may receive the signal from the first communication node, generate a signal including the requested information in response to the received signal, and transmit the generated signal to the first communication node. The signal may be transmitted via a data line between the first communication node and the second communication node. The signal including the type of the PD, information related to the class power requirement, and the like may be configured as follows.

FIG. 6 is a block diagram illustrating a signal generated by a communication node.

As shown in FIG. 6, a signal 600 may have a size of 64 bits. The signal 600 may include a PD information field 610 having a size of 8 bits, an address field 620 having a size of 48 bits, and a cyclic redundancy check (CRC) field 630 having a size of 8 bits. The PD information field 610 may indicate the type, the class power requirement, etc. of the PD included in the communication node (e.g., the second communication node) that has generated the signal 600. The address field 620 may indicate an identifier of the communication node that has generated the signal 600 (e.g., a PHY address, a MAC address, etc. of the second communication node). The value of the CRC field 630 may be generated based on the previous 56 bits (e.g., the PD information field 610 and the address field 620).

Referring once again to FIG. 5, the first communication node (e.g., the PSE and the PHY layer unit included in the first communication node) may receive, from the second communication node, the signal including information related to the type, the class power requirement, etc. of the PD included in the second communication node. The first communication node (e.g., the PSE and the PHY layer unit included in the first communication node) may identify the type and class power requirement of the PD included in the second communication node based on the received signal. Also, the first communication node (i.e., the PHY layer unit and the MAC layer unit included in the first communication node) may identify the identifier of the second communication node from the received signal.

The first communication node (e.g., the PSE included in the first communication node) may determine the power to be supplied to the second communication node based on the identified type and class power requirement of the PD, and supply the determined power to the second communication node via the data line (S520). The second communication node (e.g., the PD included in the second communication node) may obtain the power from the first communication node via the data line and may operate based on the obtained power.

Meanwhile, the first communication node (e.g., the PSE and the PHY layer unit included in the first communication node) may check whether a fault has occurred by monitoring the data line (S530). The first communication node may check whether a fault has occurred through two methods.

In the first method, the output voltage, the output current, and the like may be measured at the PI of the first communication node, and it may be determined whether the measured output voltage (or output current) falls within a predetermined range (e.g., $V_{PSE(min)}$ to $V_{PSE(max)}$ for each class described in Tables 1 and 2). If the measured output voltage (or output current) falls within the predetermined range, the first communication node may determine that no fault has occurred. On the contrary, if the measured output voltage (or output current) does not fall within the predetermined range, the first communication node may determine that a fault has occurred. That is, the first communication node may determine that the second communication node is in a fault state.

In the second method, the first communication node may receive a signal including an indicator indicating whether a fault has occurred from the second communication node through the data line, and determine whether a fault has occurred in the second communication node based on the indicator included in the received signal. Here, the first communication node may monitor the data line after a predetermined time from the start of power supply. The predetermined time may be the time required for the second communication node to determine whether a fault has occurred.

In the case that a fault has occurred, the first communication node (e.g., the PSE, the PHY layer unit, and the MAC layer unit included in the first communication node) may generate a signal including an indicator indicating the occurrence of the fault, and notify the occurrence of the fault by transmitting the generated signal (S540). Also, the first communication node may store fault related information (e.g., whether a fault has occurred, a cause of the occurrence (e.g., fault code), the identifier of the communication node in the fault state, etc.).

The signal including the indicator indicating the occurrence of the fault may be transmitted in a broadcast or multicast manner. The indicator may be represented by 1 bit. For example, if the indicator is set to 0, it may indicate that no fault has occurred, and if the indicator is set to 1, it may indicate that a fault has occurred. Further, the signal may include the identifier of the communication node (e.g., the second communication node) in the fault state, and the identifier of the communication node may be mapped to the indicator indicating the occurrence of the fault. Here, the identifier of the communication node may be a PHY address or a MAC address of the communication node obtained through step S510. Further, the signal may indicate whether a fault has occurred in each of the plurality of communication nodes. In this case, both of the identifier and the indicator for each communication node in the fault state may be included in the signal.

The first communication node (the PSE included in the first communication node) may stop the power supply to the second communication node in the fault state (S550). Here, although it is explained that the step S550 is performed after the step S540, the order of execution may not be limited thereto. For example, the step S550 may be performed before the step S540, or may be performed concurrently with the step S540. Meanwhile, when the fault of the second communication node is resolved (for example, when the second communication node normally operates) in the state where the power supply is stopped, the second communication node (the PD included in the second communication node) may send a signal requesting resumption of the power supply to the first communication node. Upon receiving the signal from the second communication node, the first communication node (the PSE included in the first communication node) may determine that the power supply is requested to be resumed, and resume the power supply to the second communication node. In this case, the first communication node may supply the power to the second communication node based on the type and the class power requirement of the PD included in the second communication node which were identified in step S510.

In the case that no fault has occurred in the second communication node, the first communication node may continue to supply the power to the second communication node through the data line. The second communication node may operate based on the power obtained from the first communication node. Meanwhile, the second communication node may not need to acquire power from the first communication node when it can acquire power from another entity (for example, the PSE included in the second communication node). In this case, the second communication node (e.g., the PD included in the second communication node) may generate a signal including an instruction to stop the power supply, and transmit the generated signal to the first communication node through the data line. The indicator may be represented by 1 bit. For example, if the indicator is set to 0, it may indicate to supply power, and if the indicator is set to 1, it may indicate to stop power supply. Further, the signal may also include the identifier of the second communication node. The first communication node (e.g., the PSE included in the first communication node) may receive the signal from the second communication node via the data line, and stop the power supply to the second communication node when the received signal indicates to stop the power supply.

Meanwhile, an exemplary explanation of specific operations of the communication node 400 in the PD mode will be described as follows.

Figure 7:
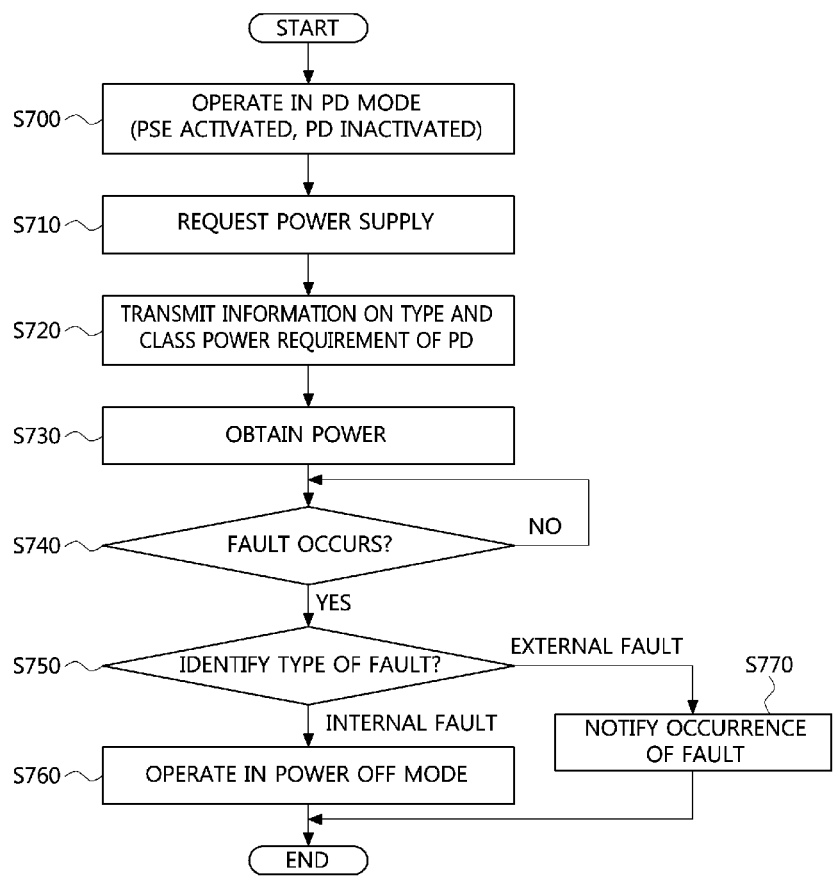
FIG. 7 is a flow chart demonstrating embodiments of an operation method of a communication node in a vehicle network based on PoDL.

FIG. 7 is a flow chart explaining embodiments of an additional operation method of a communication node in a vehicle network based on PoDL.

As shown in FIG. 7, the first communication node (e.g., the communication node 400 described with reference to FIG. 4) may operate in the PD mode if the PSE is operating abnormally (S700). In the PD mode, the first communication node may operate based on the deactivated PSE and the activated PD. If the PSE operates abnormally, a circuit constituting the PSE may be in an open state or a short state.

Since the first communication node operating in the PD mode cannot obtain a power from its PSE, the first communication node (e.g., the PD included in the first communication node) may request the power supply to another communication node (e.g., the second communication node) (S710). The second communication node may be connected to the first communication node through the data line. The second communication node may be the first communication node 310 described with reference to FIG. 3 or the communication node 400 described with reference to FIG. 4. The first communication node may transmit a signal to the second communication node via the data line such that a voltage within the predetermined range (e.g., 2.8 volts to 3.2 volts) is detected in the PI of the second communication node. The second communication node may determine that a PD (e.g., the first communication node including the PD) is present when a voltage within the predetermined range is detected on the data line, and the power supply is requested from the first communication node.

When the power supply is requested from the first communication node, the second communication node (e.g., the PSE included in the second communication node) may request information related to the type and the class power requirement of the PD included in the first communication node to the first communication node. The type of the PD may be classified into an 'A' type supporting 100BASE-T1 Ethernet, a 'B' type supporting 1000BASE-T1 Ethernet, and an 'A+B' type supporting both 100BASE-T1 Ethernet and 1000BASE-T1 Ethernet. Also, a type supporting 10GBASE Ethernet, or a type supporting 100GBASE Ethernet may be further defined. The class power requirements of the PD may be the same as explained in the Tables 1 and 2.

The first communication node (e.g., the PD and the PHY layer unit included in the first communication node) may generate a signal including the information related to the type and the class power requirement of its PD, and transmit the generated signal to the second communication node through the data line (S720). The signal generated by the first communication node may be the same as or similar to the signal 600 described with reference to FIG. 6. For example, the signal may include the PD information field, the address field, and the CRC field. The PD information field may indicate the type and the class power requirement of the PD included in the first communication node. The address field may indicate an identifier (e.g., PHY address, MAC address, etc.) of the first communication node.

The second communication node (e.g., the PSE and the PHY layer unit included in the second communication node) may receive the signal from the first communication node via the data line, and identify the type and the class power requirement of the PD included in the first communication node based on the received signal. The second communication node (e.g., the PSE and the PHY layer unit included in the second communication node) may determine the power to be supplied to the first communication node based on the type and the class power requirement of the PD included in the first communication node, and supply the determined power to the first communication node through the data line. The first communication node (e.g., the PD included in the first communication node) may obtain the power from the second communication node through the data line (S730), and may operate based on the obtained power.

Meanwhile, the first communication node (e.g., the PD and the PHY layer unit included in the first communication node) may identify whether or not a fault has occurred (S740). The first communication node (e.g., the PD and the PHY layer unit included in the first communication node) may identify the type of fault (e.g., internal fault, external fault, etc.) that occurred when the fault occurred (S750). The first communication node may operate in a power-off mode (or a sleep mode) when an internal fault occurs (S760). The internal fault may be a case when the circuit constituting the first communication node is in an open state or a short state. In the power-off mode, both the MAC layer unit and the PHY layer unit of the first communication node may be deactivated. In the sleep mode, the first communication node may operate with a minimum power. For example, in the sleep mode, the MAC layer unit of the first communication node may be deactivated and the PHY layer unit of the first communication node may be activated. Further, the first communication node may store fault related information (e.g., whether or not a fault has occurred, cause of occurrence (e.g., fault code), etc.) in its database.

The first communication node (e.g., the PD, the PHY layer unit, and the MAC layer unit included in the first communication node) may generate a signal including an indicator indicating the occurrence of the fault when an external fault occurs, and notify the occurrence of the fault by transmitting the generated signal (S770). Also, the first communication node may store fault related information (e.g., whether or not a fault has occurred, a cause of occurrence (e.g., fault code), an identifier of the faulty communication node, etc.) in its database. The external fault may be a case where the circuit constituting the first communication node and the other communication node connected through the data line is in an open state or a short state.

The signal including the indicator indicating the occurrence of the fault may be transmitted in a broadcast or multicast manner. The indicator included in the signal may be represented by 1 bit. For example, if the indicator is set to 0, it may indicate that no fault has occurred, and if the indicator is set to 1, it may indicate that a fault has occurred. Further, the signal may include an identifier of the communication node that is in a fault state, and the identifier of the communication node may be mapped to the indicator that indicates the occurrence of the fault. Further, the signal may indicate whether a fault has occurred in each of the plurality of communication nodes. In this case, both of the identifier and the indicator for each communication node may be included in the signal.

In the case that a fault (e.g., an internal fault) has not occurred, the first communication node may operate based on the power obtained from the second communication node via the data line. On the other hand, the first communication node may not need to acquire power from the second communication node if it can acquire power from another entity (for example, the PSE included in the first communication node). In this case, the first communication node (e.g., the PD included in the first communication node) may generate a signal including an indicator for instructing stop of power supply, and transmit the generated signal to the second communication node via the data line. The indicator may be represented by 1 bit. For example, if the indicator is set to 0, it may indicate to supply power, and if the indicator is set to 1, it may indicate to stop power supply. Further, the signal may further include an identifier (e.g., PHY address, MAC address, etc.) of the first communication node. The second communication node (e.g., the PSE included in the second communication node) may receive the signal from the first communication node via the data line, and stop the power supply to the first communication node when the received signal indicates to stop the power supply.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in a vehicle network, which includes a power sourcing equipment (PSE) for supplying power to a second communication node and a powered device (PD) for obtaining power from the second communication node, the operation method comprising:
   operating the first communication node in a first mode which is different from a second mode, wherein the first mode is a state in which the PSE is activated and the PD is inactivated, and the second mode is a state in which the PSE is inactivated and the PD is activated;
   receiving, from the second communication node, a first signal requesting power supply; and
   supplying power to the second communication node in response to the first signal.

2. The operation method according to claim 1, wherein the first communication node is coupled to the second communication node via a data line, the first signal is received from the second communication node via the data line, and the power is supplied to the second communication node from the first communication node via the data line.

3. The operation method according to claim 1, further comprising operating the first communication node in the second mode based on the PSE that is inactivated and the PD that is activated when the first communication node is in a fault state.

4. The operation method according to claim 1, wherein the second communication node includes a PD for obtaining the power supplied from the first communication node.

5. The operation method according to claim 1, further comprising determining the power supply is requested from the second communication node when the first signal has a voltage within a predetermined range.

6. The operation method according to claim 2, further comprising:
monitoring the data line; and
stopping the power supply to the second communication node when the second communication node is determined to be in a fault state based on a result of the monitoring of the data line.

7. The operation method according to claim 6, further comprising determining the second communication node is in the fault state when an output voltage of the first communication node is outside a predetermined range.

8. The operation method according to claim 6, further comprising determining the second communication node is in the fault state when an output current of the first communication node is outside a predetermined range.

9. The operation method according to claim 6, further comprising transmitting a second signal including an indicator indicating an occurrence of a fault.

10. The operation method according to claim 9, wherein the second signal further includes an identifier of the second communication node in the fault state.

11. The operation method according to claim 9, further comprising storing a fault code indicating a cause of the fault in a database.

12. An operation method of a first communication node in a vehicle network, which includes a power sourcing equipment (PSE) for supplying power to a second communication node and a powered device (PD) for obtaining power from the second communication node, the operation method comprising:
operating the first communication node in a second mode which is different from a first mode, wherein the first mode is a state in which the PSE is activated and the PD is inactivated, and the second mode is a state in which the PSE is inactivated and the PD is activated;
transmitting, to the second communication node, a first signal requesting power supply; and
obtaining power from the second communication node after transmitting the first signal.

13. The operation method according to claim 12, wherein the first communication node is coupled to the second communication node via a data line, the first signal is transmitted to the second communication node via the data line, and the first communication node obtains the power from the second communication node via the data line.

14. The operation method according to claim 12, further comprising operating the first communication node in the second mode when the first communication node is in a fault state.

15. The operation method according to claim 12, wherein the second communication node includes a PSE for supplying the power to the first communication node.

16. The operation method according to claim 12, further comprising operating in a power-off mode when the first communication node is determined to be in a fault state.

17. The operation method according to claim 12, further comprising transmitting a second signal including an indicator indicating an occurrence of a fault when a third communication node coupled to the first communication node is determined to be in a fault state.

18. A first communication node in a vehicle network, the first communication node comprising:
a power sourcing equipment (PSE) supplying power to a second communication node via a data line in the vehicle network; and
a powered device (PD) obtaining power from the second communication node via the data line,
wherein the first communication node operates in a first mode or a second mode, the first mode being a state in which the PSE is activated and the PD is inactivated, and the second mode being a state in which the PSE is inactivated and the PD is activated.

19. The first communication node according to claim 18, wherein the PSE receives a signal requesting power supply from the second communication node, and the PSE supplies the power to the second communication node in response to the received signal.

20. The first communication node according to claim 18, wherein the PD transmits a signal requesting power supply to the second communication node, and the PD obtains the power from the second communication node after transmitting the signal.

* * * * *